Oct. 27, 1925.

T. L. SMITH, JR 1,558,644

SCALE

Filed May 28, 1925    2 Sheets-Sheet 1

INVENTOR
Theodore L. Smith Jr.
BY
Edward N. Pagelsen
ATTORNEY

Oct. 27, 1925.

T. L. SMITH, JR

SCALE

Filed May 28, 1925

1,558,644

2 Sheets-Sheet 2

INVENTOR
Theodore L. Smith Jr
BY
Edward N. Pagelsen
ATTORNEY

Patented Oct. 27, 1925.

1,558,644

UNITED STATES PATENT OFFICE.

THEODORE L. SMITH, JR., OF DETROIT, MICHIGAN, ASSIGNOR TO THE CAILLE BROTHERS COMPANY, OF DETROIT, MICHIGAN, A CORPORATION OF MICHIGAN.

SCALE.

Application filed May 28, 1925. Serial No. 33,369.

*To all whom it may concern:*

Be it known that I, THEODORE L. SMITH, Jr., a citizen of the United States, and residing at Detroit, in the county of Wayne and State of Michigan, have invented a new and Improved Scale, of which the following is a specification.

This invention relates to the connection between the lever mechanism and the indicating mechanism of weighing scales, and its object is to produce a device of this character which can be accurately made so that the indicating mechanism will move equal distances for equal increments of load on the lever mechanism.

Figure 1:
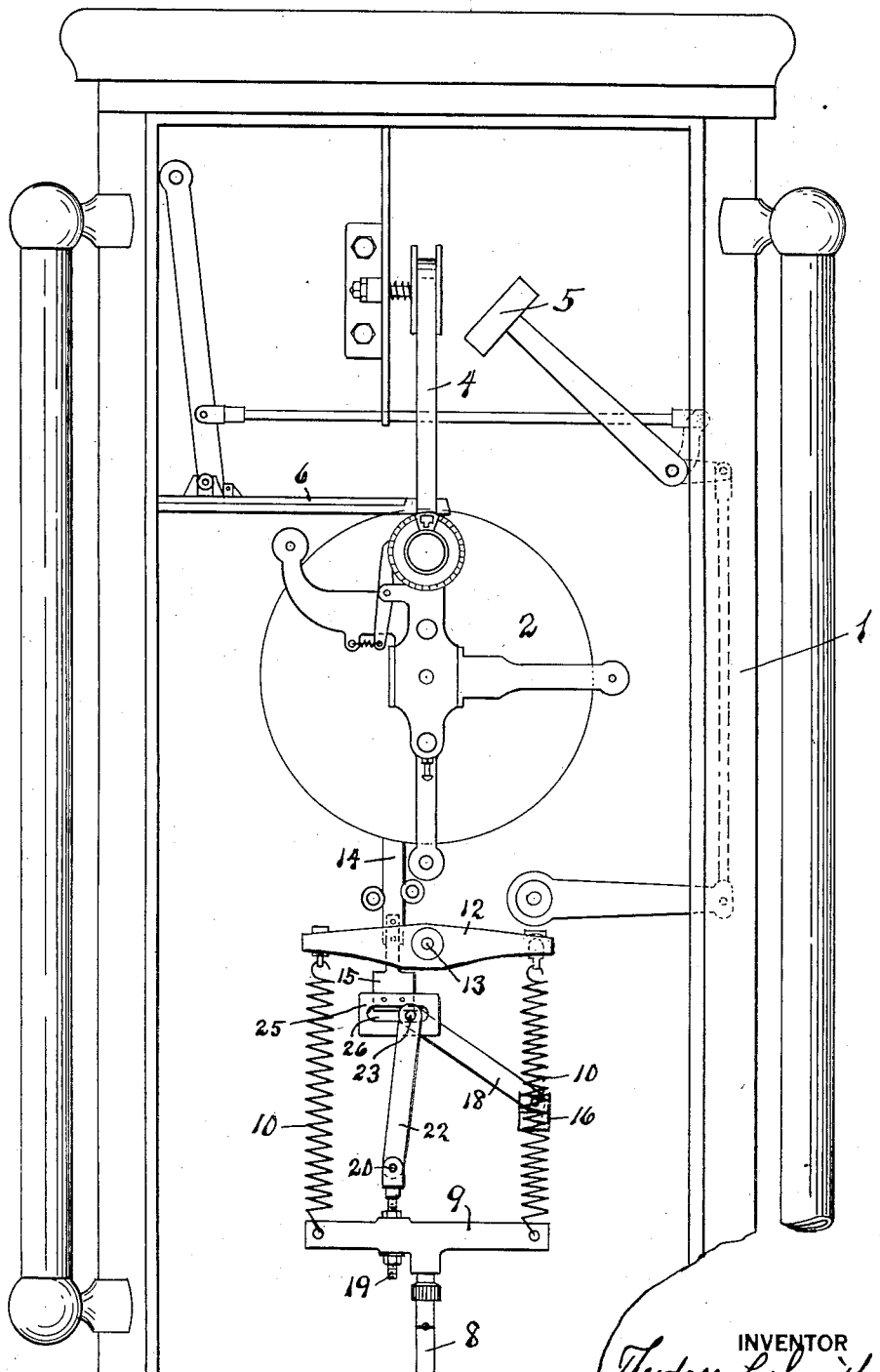
Figure 2:
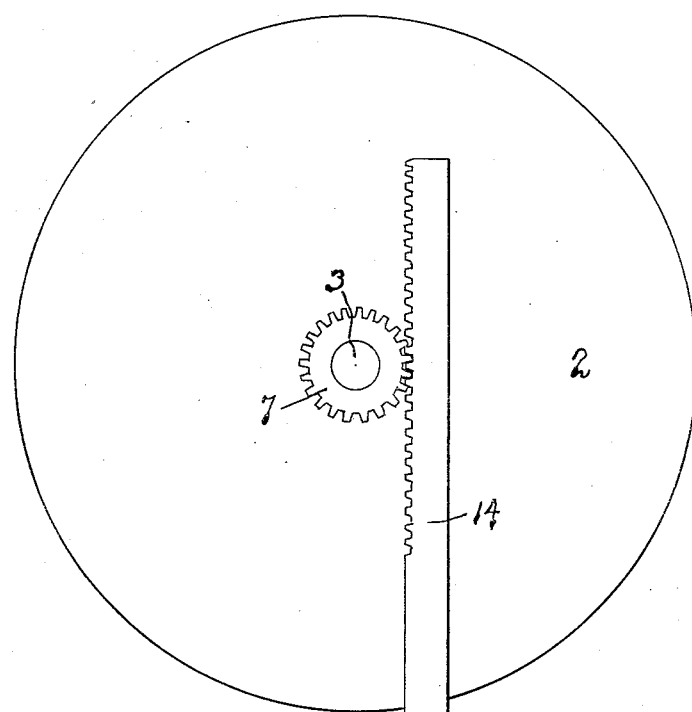
Figure 3:
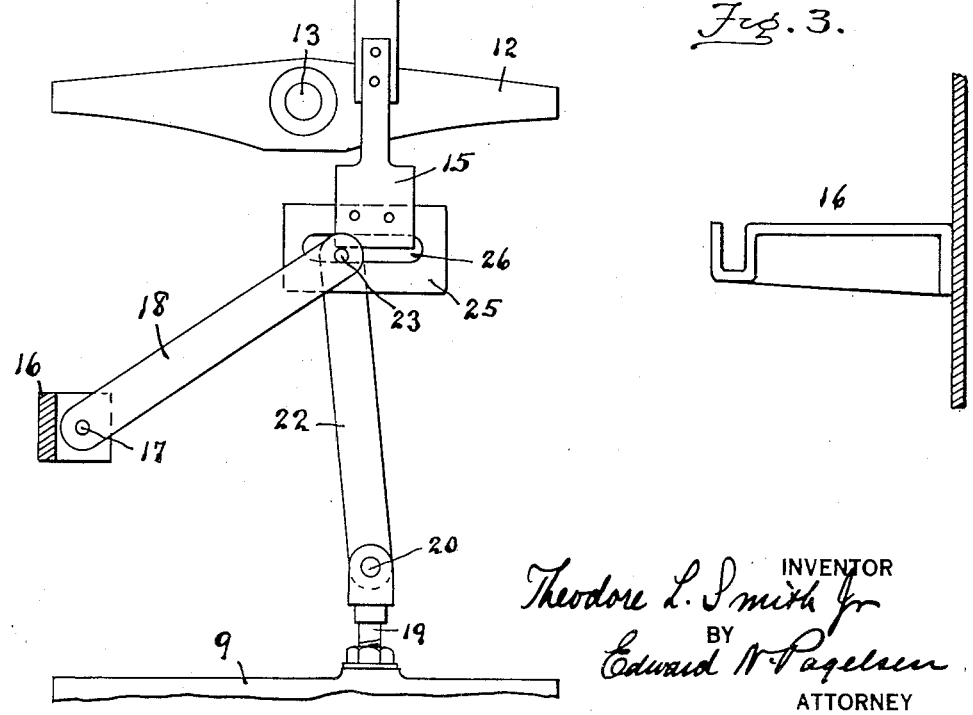

This invention is illustrated in the accompanying drawings, in which Fig. 1 is a front elevation of the weight indicating mechanism of a scale. Fig. 2 is a rear elevation of the essential parts thereof. Fig. 3 is a plan of a bracket.

Similar reference characters refer to like parts throughout the several views.

In heavy duty scales such as those designed to weigh several hundreds of pounds, the distances the indicating mechanism travels for the increments in load are relatively small. This is especially true where springs are employed to resist the loads and where the indicating device is rotatable by means of a rack bar connected to the lever mechanism, and slight inaccuracies of construction result in serious errors in weight indications.

In the drawings, a case 1 supports a rotatable dial 2 mounted on a pin 3, the periphery of the dial being provided with type to co-act with an ink ribbon 4 and a hammer 5 to print weights on tickets which are fed along by a slide 6. Any other desired character of indicating or printing mechanism may be employed as it forms no part of the present invention, nor does the pinion 7 attached to the dial 2.

A rod 8 extends up from the lever mechanism and the cross bar 9 at the upper end thereof transmits the stresses of the loads to the springs 10 which are hung on the cross-bar 12 which is mounted on a pivot 13 carried by the frame of the scale. It is customary to attach the lower end of the rack-bar 14 to the cross bar 9 which results in the dial 2 responding to the inaccuracies of the teeth of the rack bar and of the pinion 7 and to the peculiarities of the springs which do not always expand exactly in proportion to the loads.

My present invention consists in a novel connection between the cross-bar 9 and the rack-bar 14. A plate 15 may be formed on or attached to the lower end of the rack-bar and a bracket 16 carried by the case supports a pivot 17 on which the link 18 is mounted. An adjustable bolt 19 carries a pin 20 on which a second link 22 is mounted. The two links are connected and spaced by a pin 23 and the plate 15 rests on this pin.

The height of this pin 23 is fixed by the bolt 19 so that when no load is on the scale, the dial 2 will be at zero. A test weight is then placed on the scale which will cause the pin 23 to swing down and to the left in Fig. 1, resulting in a new area of the plate 15 resting on the pin. If the dial 2 indicates a lesser weight, the plate 15 is scraped at this point of contact until the dial indicates the correct amount. If it indicates a greater weight, then the pin 20 carried by the bolt 19 must be raised and the initial corner of the plate cut away until the dial is at zero, after which the test weights are applied.

By continuing these tests and scrapings of the lower edge of the plate 15, the scale is accurately "sealed" for its entire capacity. While the weight of the rack-bar will cause it to turn the dial as the pin 23 swings down, this may be at a much lower rate than the movement of this pin. A plate 25 may therefore be secured to the lower end of the rack-bar and be provided with a slot 26 to receive the pin 23, by means of which the rack-bar will be pulled down by the pin 23 whenever it is moved down by the cross-bar 9 under the pull of the load on the scale.

The details of the construction of this connecting device between the lever mechanism and the indicating mechanism of a scale may all be changed by those skilled in the art without departing from the spirit of my invention as set forth in the following claims.

I claim:—

1. In a scale, a rack-bar and a weight indicating mechanism actuated thereby, a load receiving mechanism, a link and a pivot therefor connected to the load receiving mechanism, a second link and a fixed pivot therefor, and a pin connecting the free ends of the links, said pin being caused to travel vertically and laterally as the weight receiving mechanism moves up and down, the lower end of the rack-bar being sufficiently wide to contact with said connecting pin throughout its movements.

2. In a scale, a rack-bar and a weight indicating mechanism actuated thereby, a load receiving mechanism, a link and a pivot therefor connected to the load receiving mechanism, a second link and a fixed pivot therefor, a pin connecting the free ends of the links, said pin being caused to travel vertically and laterally as the weight receiving mechanism moves up and down, the lower end of the rack-bar being sufficiently wide to contact with said connecting pin throughout its movements, and a plate attached to the rack-bar and provided with a slot to receive the connecting pin to cause the rack-bar to move down with the pin under pull of the load.

3. In a scale, a weight indicator and an operating bar therefor, load resisting springs and a cross-bar to transmit the pull of the load to said springs, a pivot on said cross-bar, a stationary pivot, links mounted on said pivots, and a pin connecting the ends of said links and engaging the operating bar of the indicator to position it together with the indicator.

4. In a scale, a weight indicator and an operating bar therefor, a link and a stationary pivot therefor, a pin carried by the end of the link and adapted to swing through a vertical arc while in engagement with the operating bar, a load resisting device, and means to cause said pin to move up and down with said load resisting device.

5. In a scale, a weight indicator and an operating device therefor, weight resisting springs and a pivot supported thereby and means connecting said pivot to the weight receiving mechanism of the scale, a stationary pivot, and means connected to said pivots and caused to travel through a vertical arc upon the scale being loaded and engaging the operating device for the indicator to cause it to move equal distances for equal increments of load on the scale.

THEODORE L. SMITH, Jr.